March 20, 1962 K. R. SLOAN ETAL 3,025,944
ARTICLE ORIENTING AND POSITIONING DEVICE
Filed March 16, 1960 2 Sheets-Sheet 1
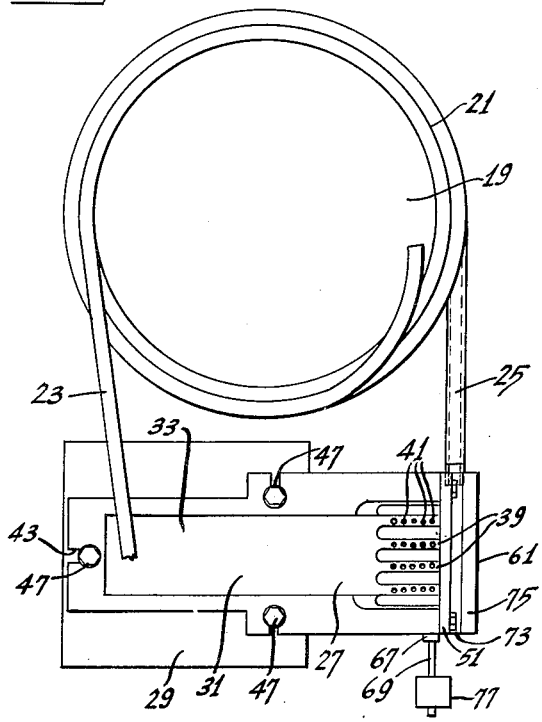
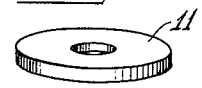
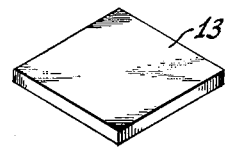
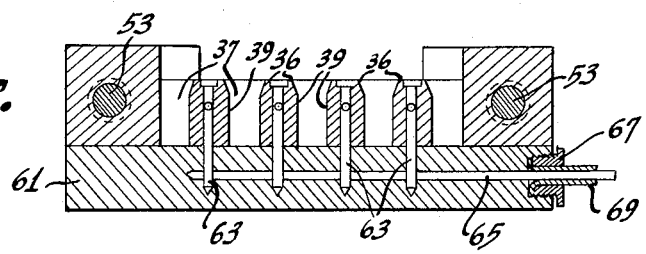
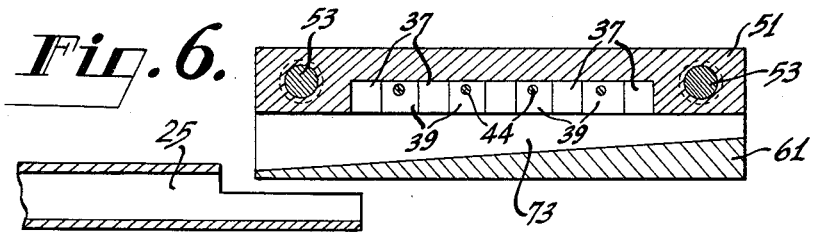
INVENTORS
HERMAN W. BAER &
KENNETH R. SLOAN
BY W.S. Hill
AGENT

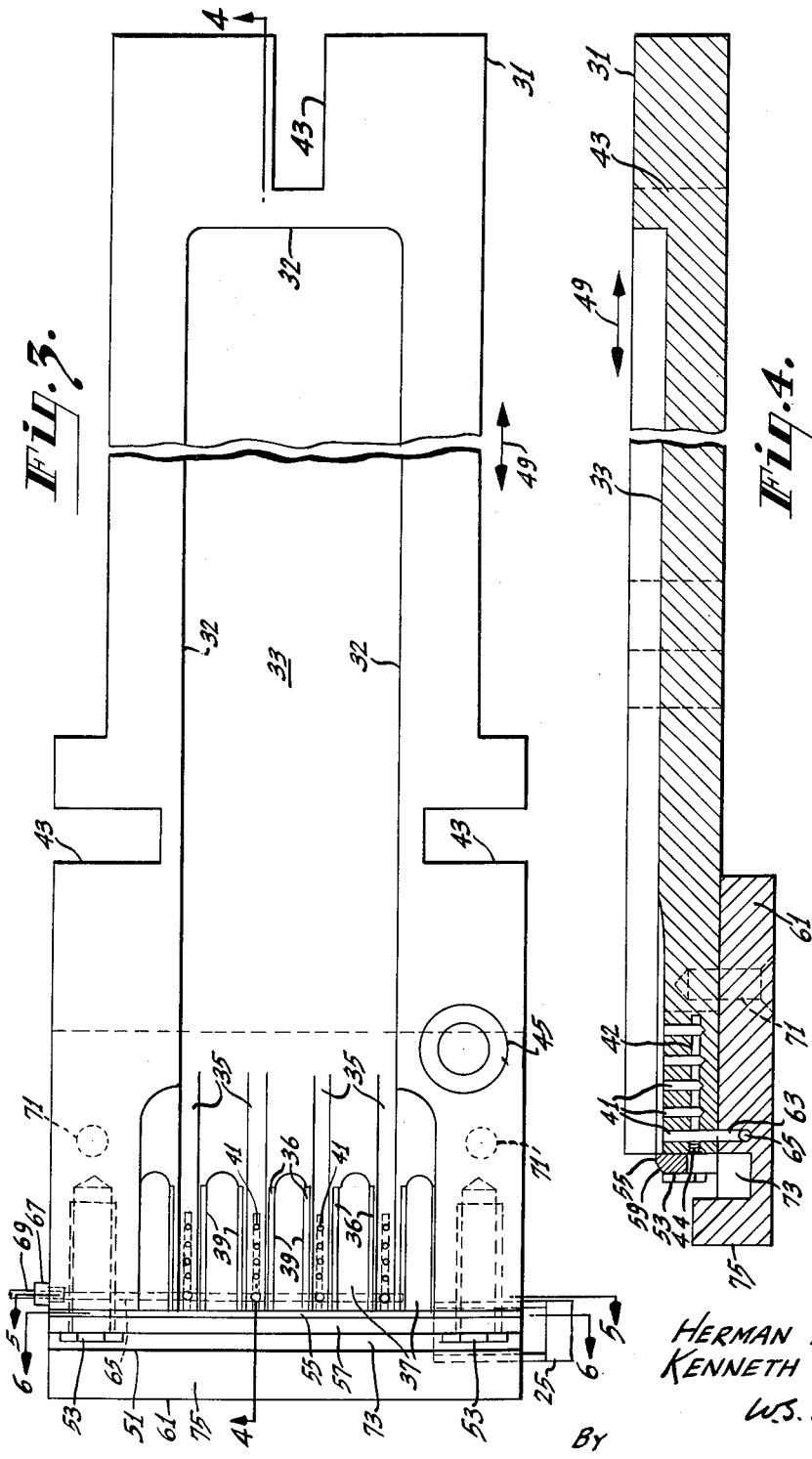

3,025,944
ARTICLE ORIENTING AND POSITIONING DEVICE
Kenneth R. Sloan, Nutley, and Herman W. Baer, Somerville, N.J., assignors to Radio Corporation of America, a corporation of Delaware
Filed Mar. 16, 1960, Ser. No. 15,465
8 Claims. (Cl. 198—30)

This invention relates to apparatus for orienting and positioning small flat-like or plate-like objects. It is particularly directed to vibratory apparatus for positioning and orienting unoriented flat-like articles, such as very small disks or wafers of germanium or silicon semiconductor material in prescribed locations and orientation prior to being mechanically and automatically delivered for assembly into semiconductor devices.

The prior art found it difficult to position and orient mechanically, small flat-like wafers of semiconductor materials because the articles tend to adhere to one another and because the properties thereof deteriorate with ordinary handling. As a result, the assembly of semiconductor devices ordinarily includes manually positioning semiconductor wafers, as when the wafers are positioned on the base tabs prior to soldering thereto.

It is an object of this invention to provide improved apparatus for mechanically orienting and positioning small unoriented flat-like articles to precisely-defined locations and in a prescribed orientation.

Another object is to provide apparatus for orienting and locating semiconductor wafers, which apparatus is compatible with equipment for mechanically and automatically assembling said wafer into semiconductor devices.

In general, the invention comprises apparatus for feeding flat-like articles having two major opposed surfaces to a precisely defined location and in a prescribed orientation, comprising a feeder plate having a horizontal floor portion, means attached to said floor portion for guiding said articles in single file upon one of their major surfaces along a prescribed path on said floor portion, and means in operative relation with said guiding means for stopping and holding successive articles in file at prescribed positions in said guiding means, said guiding means providing unobstructed passage off said plate of articles not in said guiding means.

In operation cycle, a batch of randomly oriented flat-like articles are deposited upon the floor portion. The floor is vibrated in a direction parallel to the plane of the floor in the direction of the guiding means. The vibration causes a portion of the articles to move along the floor into the guiding means in a single file in the prescribed orientation to precisely defined locations. The path of the other flat-like articles on the floor portion, being unobstructed by the guiding means, passes off the floor into a spillage tray. The vibration is then stopped and the oriented and positioned articles are mechanically removed from the guiding means. The apparatus then repeats its cycle.

In a preferred embodiment, the apparatus includes also a reservoir for randomly oriented articles in the form of a vibratory feeder bowl provided with an outfeed track for feeding articles to the feeder plate and a return track for carrying articles in the spillage tray back into the feeder bowl. The outfeed track spirals up the inner side of the wall of the feeder bowl and extends out to the feeder plate. The return track extends from just below the spillage tray and spirals up the outer side of the wall of the feeder bowl and into the center thereof. When the bowl is vibrated, a batch of articles in the bowl moves up to the inside outfeed track to drop to the floor portion of the feeder plate. At the same time, excess articles in the spillage tray which have dropped into the return track move, by vibration, up the outside track of the bowl and then drop into the vibratory bowl.

In a preferred embodiment also, a plurality of guiding means comprise parallel tracks depressed from the floor with extensions of the floor providing parallel guide rails on each side of each track. In this way a plurality of lines of positioned and oriented articles are provided with each cycle of operation.

In the drawings:
FIGURES 1a and 1b are perspective views of representative flat-like articles suitable for orienting and positioning with the apparatus of the invention.
FIGURE 2 is a partially-schematic plan view of an apparatus according to the invention.
FIGURE 3 is an enlarged plan view of the assembled feeder plate of FIGURE 2.
FIGURE 4 is a longitudinal sectional view of the assembled feeder plate of FIGURES 2 and 3 viewed along the cut lines 4—4.
FIGURE 5 is a transverse sectional view of the assembled apparatus of FIGURE 3 viewed along the cut lines 5—5 and
FIGURE 6 is a transverse sectional view of the assembled apparatus of FIGURE 3 viewed along the cut lines 6—6.

FIGURES 1a and 1b illustrate the shape of articles representative of the type which may be oriented and positioned with the apparatus of the invention. FIGURE 1a shows a small flat-disk washer 11 which may, for example, be one of the type used in transistor manufacture. The washer 11 has a thickness of about 0.005 inch and an outside diameter of about 0.156 inch. FIGURE 1b shows a thin rectangular wafer 13 which may, for example, be a germanium pellet or wafer such as is used in transistor manufacture. The wafer 13 may be about 0.005 inch thick and about 0.085 inch square. In both FIGURES 1a and 1b, the articles are flat-like or plate-like having two major opposed surfaces and a thickness substantially smaller than the length and width thereof.

FIGURE 2 illustrates a preferred apparatus of the invention for orienting and positioning flat-like articles. The apparatus comprises a vibratory bowl 19 having an outfeed track 23 and a return track 25, and a feeder plate 27 mounted on a vibrator 29, so that the feeder plate is in a horizontal position with one end positioned just below the end of the outfeed track 23 and just above the return track 25. All the parts of the apparatus herein may be made of conventional materials. Aluminum metal and alloys thereof have been found to be convenient for this purpose.

The vibratory bowl 19 is a reservoir for unoriented flat-like articles. The bowl 19 includes a vertical wall 21. The outfeed track is attached to and spirals upwardly around the inside of the wall 21 rising from the floor of the bowl 19 to above the top of the wall 21 and extends outward to a position just above, but not in contact with, one end of the feeder plate 27. The return track 25 extends from a position just below, but not in contact with, the feeder plate 27 to the outside of the wall 21 near the bottom thereof and then is attached to and spirals upwardly around the outside of the wall 21 rising above the top of the wall 21, and extends inward terminating above the floor of the bowl 19.

The feeder plate 27, which is mounted on a vibrator 29 with bolts 47, is illustrated in more detail in FIGURES 3, 4, 5 and 6. The feeder plate 27 comprises a main plate 31, an end plate 51 attached to one end of the main plate 31 with mounting bolts 53, and a bottom plate 61 attached to the main plate 31 with mounting screws 71.

The main plate 31 includes a horizontal floor portion 33 covering a major surface area of the main plate 31 having shallow walls 32 on three sides thereof. The fourth side has a series of parallel guide grooves 35 which are horizontal depressions from the floor portion 33 extending longitudinally out from the floor portion. The floor portion extends between the guide grooves 35 providing parallel guide rails 36 upstanding from the guide grooves 35. The rails 36 are spaced apart a distance slightly greater than the width, if the articles are rectangular, or diameter, if the articles are circular, of a major opposed surface of the flat-like articles to be oriented and positioned. Where the articles are rectangular, the rails 36 are spaced apart a distance slightly less than the diagonal distance between the corners of said articles. The guide grooves 35 and the rails 36 extend to the edge of the main plate 31. As an alternative the bottoms of the grooves are slanted at a small angle to the horizontal, to permit the wafers to rest against one side of the grooves. Greater efficiency is obtained by this means. The end plate 51, which is attached to the main plate 31, extends to the height of the rails 36, both of which are a height above the bottom of the guide grooves 35 slightly less than the thickness of the flat-like articles to be oriented and positioned. The end plate 51 extends down from the top of the rails 36 a distance less than the thickness of the main plate 31.

A spillage slot 37 is cut into the main plate between each guide groove 35 and extends a distance into the main plate 31 somewhat less than the length of the guide groove 35. The spillage slots 37 permit excess flat-like articles to pass off the main plate 31 into the spillage groove and then under the end plate 51. Since one end of the main plate 31 has spillage slots 37 cut therein, the portions between these slots 37, comprising guide grooves 35 and guide rails 36, are referred to hereinafter as the fingers 39.

Each finger 39 has bored therein five small suction holes 41 substantially smaller in size than the width or diameter of the article to be oriented and positioned. The holes 41 extend from within the guide groove 35 vertically into the solid portion of the main plate 31, in a line along the length of the guide groove 35, and spaced apart a distance about the width or diameter of the flat-like articles to be oriented and positioned. The suction holes 41 are connected within each finger with a longitudinal manifold hole 42 extending to the end of each finger 39 and being closed with a plug 44. The suction hole 41 nearest the end of the finger 39 extends entirely through the finger 39 to the back of the main plate 31. The remaining suction holes 41 extend only a portion of the way into the main plate 31.

The end plate 51 has a narrow top portion 55 adjacent each finger 39 and a bevelled portion 57 on the upper corner thereof away from each finger 39. By virtue of the height of the rails 36 and of the top portion 55 of the end plate 51, articles lying upon other articles in the guide grooves 35 have unobstructed passage thereover and may pass over the top portion 55 of the end plate 51.

A bottom plate 61 is attached to the main plate 31 with mounting screws 71 and extends along the bottom of the main plate 31 below the fingers 39 and beyond the end of the fingers 39 a short distance. The portion of the extension beyond the ends of the fingers 39 comprises a wall 75 and a transverse slot 73, shallow at one side and deep at the other with a plane inclined floor in between. The slot 73 is hereinafter referred to as the spillage tray. Articles passing between the fingers 39 into the spillage slots 37, or over the end plate 51, all drop into the spillage tray 73 and, by virtue of the inclined floor pass to one end thereof.

The portion of the bottom plate 61 adjacent the main plate 31 has drilled therein vertical extension hole 63 of each suction hole 41 nearest the end of each finger 39, which extend therethrough. Each extension hole 63 is drilled only a portion of the way through the bottom plate 61. A transverse manifold hole 65 is drilled part way through the width of the bottom plate 61 connecting the extension holes 63. The open end of the transverse manifold hole 65 has screwed therein a fitting 67 which holds a suction tube 69 therein. The suction tube extends to a suction making apparatus and control therefor 77 shown schematically in FIGURE 2.

The main plate 31 having the end plate 51 and bottom plate 61 attached thereto is mounted at mounting slots 43 with mounting bolts 47 to a vibrator 29 which may be electrical or mechanical. The vibrator 29 is of the type which will intermittently vibrate the main plate 31 in the direction of the guide grooves 35, which is the horizontal and longitudinal direction and is in the plane of the floor portion 33 of the main plate 31. The direction of vibration of the main plate 31 is shown by the arrow 49 in FIGURE 3. In addition the vibration is such as to make the articles hop up off the plate 31 during the movement to the right in FIGURE 3 and down on the plate 31 during the movement of the plate 31 to the left. The articles are thereby made to move to the left toward the grooves 35.

The return track 25 comprises a tube positioned a short distance below the spillage tray 73. The return track 25 has its upper half removed for a somewhat longer distance than the extension below the spillage tray 73. Flat-like articles in the spillage tray 73 move to the lower end thereof and then drop off the bottom plate 61 into the return track 25. The main plate 31 is also provided with a shot pin bushing 45 for positioning the entire end plate subsequent to orienting articles in the guide grooves 35, so that the articles are positioned for automatic mechanical removal.

In a typical cycle of operation, the vibratory bowl 19 is filled with articles to be oriented and positioned and is vibrated for about 20 seconds of the operating cycle and is then stopped. During the first 10 seconds of this 20 second interval, about 100 articles pass up the outfeed track 23 and are deposited near the center of the floor portion 33 of the main plate 31. During the next 5 seconds of the 20 second interval, the vibrator 29 is operated at high speed and the suction making apparatus 77 builds up a vacuum, which extends through the various manifolds and holes to the suction holes 41. The vibrator 29 vibrates the main plate 31 causing the articles to move along the floor portion towards the guide grooves 35. Because of the relatively large floor space and the vibration of the plate, the articles come to rest on one of their major faces. As the articles move down the floor portion, some of the articles now on their major faces pass into the guide grooves 35 and between the rails 36. In order to effect a more uniform distribution of articles across the floor portion 33, it is frequently advantageous to provide interference pins (not shown) upstanding from the floor at random positions to break up clump of articles.

Because of the position of the guide rails 36 in pairs, the articles in the guide grooves 35 are oriented in the prescribed manner. Articles pass down the guide grooves 35, the first stopping at the end plate and each successive one being stopped by the article before it, providing successive articles in single file within the guide grooves. The first five articles stop at positions just above successive suction holes 41. If an article stops as a result of the vacuum from a particular port, then successive articles override the stopped articles as a result of the groove configuration and drop into any empty port spaces in the groove. During the portion of the cycle when the grooves are being filled, the excess articles pass into the spillage slots 37 passing under the end plate 51 into the spillage tray 73 or, articles resting on top of other articles pass over the end plate 51 and fall into spillage tray 73. At this point, the articles above the suction ports are held thereto by the suction, which is being applied through the suction holes 31.

During the last 5 seconds of the 20 second interval the vibratory speed of the feeder is reduced and the vacuum is turned off. At the end of the entire 20 second interval five pellets are lined up in each of four guide grooves 35 and the excess pellets have fallen into the spillage tray. Also, the excess articles in the spillage tray 37 have fallen into the return track 25.

At the end of the 20 second interval, the vibration of the main plate 31 is stopped and a shot pin is inserted into the bushing 45, positioning the end plate. The articles are removed from the guide grooves 35 by mechanical means. One convenient method for mechanical removement is to entirely release the suction in the suction ports 41 by means of the suction making apparatus 77. Four vacuum needles (not shown) pick up the first articles in each guide groove 35 by suction. The vacuum needles are moved to a desired position and the articles are deposited by releasing the vacuum. Then, this movement is repeated for each successive set of four articles until all of the oriented and positioned articles are removed. The period of time for removing the oriented and positioned articles is about 40 seconds making the total cycle of operation for the preferred apparatus herein about 60 seconds. The cycle is then repeated. During the first 10 seconds when the vibratory bowl 19 is vibrating, excess articles in the return track 25 pass upwardly in the track and are deposited in the center of the bowl 19. An alternative to the described cycle is continuous vibration and alternating suction, holding the wafers, with pickup, removing the first wafer in line.

The advantages of using the apparatus of the invention are most important for articles which are sensitive to ordinary handling techniques. With the apparatus of the invention, articles may be fed simultaneously in a plurality of rows into precisely defined locations and in a prescribed orientation. Further, the oriented and positioned articles may be picked up and deposited mechanically with other apparatus providing compatibility with larger mechanical systems. Further, the operator of the apparatus may control the portion of articles returned and time interval for feeding the articles to and from the apparatus herein. And finally, the operator may control the amount of spillage of excess articles. The spillage in the apparatus herein is of a type in which the deteriorating effect of mechanical handling is held to a minimum.

What is claimed is:

1. Apparatus for feeding plate-like articles having two major opposed surfaces to a precisely defined location and in a prescribed orientation comprising a feeder plate having a horizontal floor portion, at least one groove depressed in said floor portion for guiding said articles in single file upon one of their said major surfaces along a prescribed path on said floor portion, and means in operative relation with said guiding groove for stopping and holding successive articles in said file at prescribed positions n said guiding means, said guiding groove and said stopping means each having a height slightly less than the thickness between the major surfaces of said articles.

2. Apparatus for feeding plate-like articles of substantially uniform size and thickness and having two major opposed surfaces to a prescribed location and in a prescribed orientation comprising a feeder plate having a horizontal floor portion, at least one groove depressed in said floor portion for guiding said articles upon one of their said major surfaces in single file along a prescribed path on said floor portion, means for stopping and holding successive articles in said file at prescribed positions in said guiding groove, said guiding groove and said stopping means each having a height slightly less than the thickness between the major surfaces of said articles, and vibratory means for vibrating said floor portion in a horizontal plane in the direction of said guiding means.

3. Apparatus for feeding plate-like articles having two major opposed surfaces to a precisely defined location and in a prescribed orientation, comprising a feeder plate having a horizontal floor portion, means for depositing a batch of randomly oriented articles at one end of said plate, means for vibrating said plate whereby said articles position themselves with their major surfaces horizontal and whereby said articles move along said plate toward the opposite end thereof, means for guiding a portion of said horizontal articles in single file along a prescribed path on said floor portion, mechanical means for stopping and vacuum means for holding successive stopped articles in said file at prescribed positions in said guiding means, said guiding means comprising a groove depressed in said floor portion a depth slightly less than the thickness of said articles, means for recovering the remainder of said articles passed off said plate, and means for returning said recovered articles to said depositing means.

4. Apparatus for feeding rectangular plate-like articles having a thickness substantially smaller than the length and the width thereof to a precisely defined location and in a prescribed orientation, comprising a feeder plate having two end portions and a continuous floor portion therebetween, a guide groove depressed from said floor and extending at one end of and along a portion of said floor, said guide groove having a width slightly greater than the width of said articles and less than the diagonal distance between the corners of said articles, an end wall upstanding along said one end of said floor transverse to said groove, said guide groove and said wall further being a height slightly less than the thickness of said articles, and suction ports smaller than the length and width of said articles located at precisely spaced positions in said groove.

5. Apparatus for feeding rectangular plate-like articles having a thickness substantially smaller than the length and width thereof to a precisely defined location and in a prescribed orientation comprising a feeder plate having two end portions and a continuous horizontal floor therebetween, a guide groove depressed from said floor and extending at one end of and along a portion of said floor, said guide groove having a width slightly greater than the width of said articles and less than the diagonal distance between the corners of said articles, an end wall upstanding along said one end of said floor transverse to said groove, said guide rails and said wall being a height slightly less than the thickness of said articles, and suction ports smaller than the length and width of said articles located at precisely spaced positions along said groove and adapted to hold articles in said location and orientation, and a reservoir for receiving excess articles passing off said plate at one said end.

6. Apparatus for feeding rectangular plate-like articles having a thickness substantially smaller than the length and width thereof to precisely defined locations and in a prescribed orientation, comprising a feeder plate having two end portions and a continuous horizontal floor portion therebetween, a plurality of parallel guide grooves depressed from said floor and extending at one end of and along a portion of said floor, each guide having a width slightly greater than the width of said articles and less the diagonal distance between the corners of said articles, an end wall upstanding along said one end of said floor transverse to said grooves, said guide grooves and said wall being a height slightly less than the thickness of said articles, suction ports smaller than the length and width of said articles located at precisely spaced positions along said groove and adapted to hold articles in said location and orientation, and receiving means for excess articles passing off said plate at one said end.

7. Apparatus for feeding recangular plate-like articles having a thickness substantially smaller than the length and width thereof to a precisely defined location and in a prescribed orientation, comprising a feeder plate having two end portions and a continuous horizontal floor therebetween, a guide groove depressed from said floor and extending at one end of and along a portion of said floor, said guide groove having a width slightly greater than the width of said articles and less than the diagonal distance between the corners of said articles, an end wall upstanding along said one end of said floor transverse to said groove, said guide groove and said wall being a height slightly less than the thickness of said articles, and suction ports smaller than the length and width of said articles located at precisely spaced positions along said groove and adapted to hold articles in said location and orientation, and a reservoir for receiving excess articles passing off said plate at one said end and vibratory means for intermittently vibrating said plate in a reciprocating manner horizontally in the direction of said guide rails.

8. Apparatus for feeding rectangular plate-like articles having a thickness substantially smaller than the length and width thereof to a precisely defined location and in a prescribed orientation comprising a feeder plate having two end portions and a continuous horizontal floor therebetween, a guide groove depressed from said floor and extending at one end of and along a portion of said floor, said guide groove having a width slightly greater than the width of said articles and less than the diagonal distance between the corners of said articles, an end wall upstanding along said one end of said floor transverse to said groove, said guide groove and said wall being a height slightly less than the thickness of said articles, and suction ports smaller than the length and width of said articles located at precisely spaced positions along said guide groove and adapted to hold articles in said location and orientation, and a reservoir for receiving excess articles passing off said plate at one said end and vibratory means for intermittently vibrating said plate in a reciprocating manner horizontally in the direction of said guide and a vibratory bowl unit adapted to intermittently deposit a quantity of said articles on said floor at said other end thereof, and means for transmitting excess articles in said reservoir to said vibratory bowl unit.

References Cited in the file of this patent
UNITED STATES PATENTS
2,956,665     Arlin _____ Oct. 18, 1960